US012720371B2

(12) United States Patent
Yang et al.

(10) Patent No.: US 12,720,371 B2
(45) Date of Patent: Aug. 25, 2026

(54) METHODS, NETWORK NODES AND COMPUTER READABLE MEDIA FOR NETWORK NODE RESELECTION

(71) Applicant: Telefonaktiebolaget LM Ericsson (publ), Stockholm (SE)

(72) Inventors: Yong Yang, Kållered (SE); Maria Cruz Bartolome Rodrigo, Madrid (ES); Chunbo Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 18/551,698

(22) PCT Filed: Mar. 25, 2022

(86) PCT No.: PCT/CN2022/083031
§ 371 (c)(1),
(2) Date: Sep. 21, 2023

(87) PCT Pub. No.: WO2022/206597
PCT Pub. Date: Oct. 6, 2022

(65) Prior Publication Data

US 2025/0280332 A1 Sep. 4, 2025

(30) Foreign Application Priority Data

Apr. 1, 2021 (WO) ................ PCT/CN2021/084917

(51) Int. Cl.
*H04W 36/00* (2009.01)
*H04W 36/08* (2009.01)
(Continued)

(52) U.S. Cl.
CPC ....... *H04W 36/0033* (2013.01); *H04W 36/08* (2013.01); *H04W 36/22* (2013.01); *H04W 76/20* (2018.02)

(58) Field of Classification Search
CPC ..... H04W 48/18; H04W 48/06; H04W 36/22; H04W 36/0022; H04W 36/0033;
(Continued)

(56) References Cited

U.S. PATENT DOCUMENTS

2015/0223196 A1* 8/2015 Kim ...................... H04W 72/23 455/458
2019/0174369 A1* 6/2019 Tomikawa ............ H04W 36/12
2021/0297896 A1* 9/2021 Landais .................. H04L 47/33

FOREIGN PATENT DOCUMENTS

WO 2020200057 A1 10/2020

OTHER PUBLICATIONS

"3rd Generation Partnership Project; Technical Specification Group Core Network and Terminals; 5G System; Common Data Types for Service Based Interfaces; Stage 3 (Release 17)", 3GPP TS 29.571 V17.1.0, Mar. 2021, 129 pages.

(Continued)

*Primary Examiner* — Allahyar Kasraian
(74) *Attorney, Agent, or Firm* — Murphy, Bilak & Homiller, PLLC

(57) ABSTRACT

The present disclosure provides methods (200, 300), network nodes (500, 600, 700, 800), and computer readable media for network node reselection for a context related to a service. The method (200) at a first network node includes: determining (S201) to reselect a third network node that can provide a service for a context that was provided by the second network node: and transmitting (S203) a request message for the context to the third network node, the request message comprising property information about the request message.

23 Claims, 6 Drawing Sheets

(51) Int. Cl.
*H04W 36/22* (2009.01)
*H04W 76/20* (2018.01)

(58) Field of Classification Search
CPC ..... H04W 28/08; H04W 36/08; H04W 76/18; H04W 76/20; H04L 45/851; H04L 47/83
See application file for complete search history.

(56) References Cited

OTHER PUBLICATIONS

"3rd Generation Partnership Project; Technical Specification Group Core Network and Terminals; 5G System; Technical Realization of Service Based Architecture; Stage 3 (Release 16)", 3GPP TS 29.500 V16.2.1, Jan. 2020, 50 pages.
"3rd Generation Partnership Project; Technical Specification Group Core Network and Terminals; Study on Load and Overload Control of 5GC Service Based Interfaces; (Release 16) The present", 3GPP TR 29.843 V16.0.0, Sep. 2019, 39 pages.
"3rd Generation Partnership Project; Technical Specification Group Services and System Aspects; System architecture for the 5G System (5GS); Stage 2 (Release 16)", 3GPP TS 23.501 V16.7.0, Dec. 2020, 450 pages.
3GPP , "3rd Generation Partnership Project; Technical Specification Group Core Network and Terminals; 5G System; Technical Realization of Service Based Architecture; Stage 3 (Release 17)", 3GPP TS 29.500 V17.1.0, Dec. 2020, 1-90.
Allman, M , et al., "TCP Congestion Control", RFC 5681, Sep. 2009, 18 pages.
Belshe, M , et al., "Hypertext Transfer Protocol Version 2 (HTTP/2)", RFC 7540, May 2015, 96 pages.
"IP Index in UDM", 3GPP TSG-CT WG4 Meeting #103-e, C4-212106, 29.503 CR0610, Ericsson, E-Meeting, Apr. 14-24, 2021, 6 pages.
"New header for requests sent to an (alternate) NF and overload control", 3GPP TSG-CT WG4 Meeting #103e, C4-212474 was C4-212016, Ericsson, E-Meeting, Apr. 14-23, 2021, 5 pages.
"Reselection when receiving OCI", 3GPP TSG-CT WG4 Meeting #103e, C4-212106 (C4-212016), 29.500 CR0238, Ericsson, E-Meeting, Apr. 14-23, 2021, 5 pages.
"Update Binding Indication for multiple resource contexts", 3GPP TSG-CT WG4 Meeting #102e, C4-211618 was C4-211252, Ericsson, E-Meeting, Feb. 24-Mar. 5, 2021, 7 pages.
Fielding, R , et al., "Hypertext Transfer Protocol (HTTP/1.1): Message Syntax and Routing", RFC 7230, Jun. 2014, 89 pages.

* cited by examiner

METHODS, NETWORK NODES AND COMPUTER READABLE MEDIA FOR NETWORK NODE RESELECTION

TECHNICAL FIELD

The present disclosure generally relates to the technical field of communication technologies, and particularly to methods, network nodes, and computer readable media for network node reselection.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

NF Service Set and NF Set

According to Clause 5.21.3.2 of 3GPP TS 23.501 V16.7.0 (which is incorporated herein in its entirety by reference), an NF Service Set is defined as a group of interchangeable NF service instances of the same service type within an NF instance, wherein the NF service instances in the same NF Service Set have access to the same context data. And, an NF Set is defined as a group of interchangeable NF instances of the same type, supporting the same services and the same Network Slice(s), wherein the NF instances in the same NF Set may be geographically distributed but have access to the same context. When a Network Function (NF) Set or an NF Service Set is deployed in the network as specified in Clauses 5.21.3 and 6.3.1.0 of 3GPP TS 23.501 V16.7.0, an NF Service Producer in a NF (Service) Set creates resource context(s) and the context(s) is shared by all the NF (Service) instances pertaining to the same NF (Service) Set, i.e. the resource context is bound to the NF (Service) Set. So, requests targeting the resource may be served by any NF (Service) Instance within the NF (Service) Set, unless the shared contexts are lost.

For example, as shown in FIG. 1, Server 1 and Server 2 are in the same set. If a context is handled by Server 1, while Server 1 cannot handle the context at some time point due to some reasons, the context can be smoothly handled by Server 2, since the context is stored in a common central database, e.g. in a Unstructured Data Storage Network Function (UDSF) for the set, which can be accessed by all servers, such as Server 1, Server 2, in the same set.

In the network, an NF may select another NF that may provide a service it needs, and transmit a request message (e.g., a Hypertext Transfer Protocol (HTTP) request message) for the service to the other NF. Here, the NF that transmits the request message may be called a “Client”, which may refer to an NF service consumer, or a Service Communication Proxy (SCP) e.g. for regular request messages, or an NF service producer e.g. for notification request messages. Accordingly, the NF that receives the request message may be called a “Server”, which may refer to an NF service producer, an SCP, or an NF service consumer in any appropriate scenarios. For example, an NF service consumer (as a Client), may consume a service provided by an NF service producer (as a Server).

For some reasons, e.g., overload, a temporary cause, or unreachable, etc., the Client determines that the selected Server cannot provide the service requested by the Client. In this case, the Client may reselect another Server in the same set, which may also provide the requested service.

FIG. 1 schematically shows an exemplary reselection process that is triggered by e.g., overload of Server 1 that has previously selected by the Client.

It should be noted that overload of Server 1 is illustrated here as an exemplary reason for triggering the reselection process, there may be other possible reasons for triggering the reselection process, such as Server 1 being unreachable, or Server 1 rejecting the request message of the Client with a temporary cause, etc., which are not limited in the present disclosure.

In S1_1, the Client initially selects a Server instance (Server 1 in this example), based on selection criteria, such as locality, priority, load, etc.

In S1_2, the Client transmits, to the Server 1, a request message for Service A to establish a (resource) context X related to Service A. In particular, a request message is transmitted per context (e.g., per UE, or per Packet Data Unit (PDU) session) related to a service, and a service may be related to at least one context.

In S1_3, the Server 1 creates the context X related to Service A.

In this example, in S1_4, the Server 1 is overloaded.

In S1_5, the Client may transmit, to the Server 1, e.g., a request message for e.g. Service A to establish a context Y related to Service A.

In S1_6, the Server 1 may indicate to the Client that it has been overloaded, by providing Overload Control Information (OCI) that indicates overload information of Server 1, or by providing a status code, such as 429/503, indicating that the request message being rejected by the Server 1. Note that, using the status code 429/503, based on the ratio of the number of rejected request messages (with the status code 429/503) and the total number of request messages, the Client may derive overload information of Server 1 as OCI. For example, the Server 1 may indicate in the OCI an exact percentage of the number of request messages it wants the Client to reduce.

In S1_7, the Client may store related information about the Server 1 being overloaded, with the OCI. The Client needs to reduce the signaling messages sent towards the Server 1, which may be achieved by either rejecting the original request message received at the Client e.g. from an upstream NF or a User Equipment (UE), or by reselecting an alternative NF base on the resilience information of the context, e.g. the Binding Information of the context.

In S1_8, the Client may receive a request for the context X, e.g. from an upstream NF or a UE, which leads the Client to consume Service A to update the context in the Server 1. Since the Client knows that the Server 1 is overloaded, it may determine to reselect an alternative NF (Server 2 in this example) in the set where the Server 1 is located. As previously described, the servers in the same set may provide the same service for the context, and accordingly, the context related to the service may be handled by any of the servers in the set.

In S1_9, the Client may transmit a request message for the context X to the Server 2 in the set where the Server 1 is located.

In S1_10, the Server 2 may accept the request message. However, such acceptance may result in that the Server 1 is even more overloaded. For example,

- for an overloaded Access and Mobility Management Function (AMF), if an alternative AMF is selected for Namf_communication service, e.g. for service operation, N1N2Message Transfer, the alternative AMF may page the UE. However, when the UE answers paging, it will still initiate a service request towards the overloaded AMF;

as another example, an overloaded Session Management Function (SMF), i.e., SMF1, is serving a request message for a session from a peer NF, e.g., a Policy Control Function (PCF), so the context (for the session) in the UDSF may be locked by this SMF1; at the same time, another peer NF, e.g. an AMF, may attempt to contact this overloaded SMF1 for the same context. In such scenario, the AMF may determine to reselect an alternative SMF, i.e., SMF2, as it knows that the SMF1 is overloaded. However, when the alternative SMF2 receives the request message and knows that the corresponding context has been locked by the SMF1, it will still redirect the request to the overload SMF1.

Therefore, the Server 2 cannot serve the request message of the Client for the context X, although the Server 2 may accept the request message during reselection.

There is no mechanism allowing a (reselected) alternative Server to take different actions appropriately upon receiving, from the Client, a request message for the existing context.

SUMMARY

Embodiments of the present disclosure provide a mechanism allowing a (reselected) alternative Server to take different actions appropriately upon receiving, from the Client, a request message for the existing context; and allowing the Client to receive and store a rejection cause to avoid any further reselections for the same rejection cause in a case where the request message is rejected by the (reselected) alternative Server.

According to a first aspect of the present disclosure, a method at a first network node (i.e., a Client) for network node reselection for a context related to a service is provided. The first network node has selected a second network node (i.e., a previously selected Server) for providing the service consumed by the first network node, and the context related to the service has been created is provided. The method includes: determining to reselect a third network node (i.e., an alternative Server) that can provide the service for the context that was provided by the second network node; and transmitting a request message for the context to the third network node, the request message including property information about the request message.

In an exemplary embodiment, said property information about the request message includes at least one of:

information indicating that the request message is involving a reselection due to a failure of reaching the second network node, information indicating that the request message is involving a reselection due to overload control for the second network node, or information indicating that the request message is involving a reselection due to a temporary rejection from the second network node during a last attempt to the second network node.

In an exemplary embodiment, the overload control for the second network node is performed by the first network node based on overload information of the second network node, wherein the overload information is indicated by OCI that is received from the second network node, or the overload information is derived from a ratio of a number of request messages being rejected by the second network node with a status code against a total number of request messages, wherein the status code is received from the second network node, indicating a request message being rejected by the second network node.

In an exemplary embodiment, said property information about the request message further includes retransmission information indicating that the request message involving the reselection has been transmitted to the second network node earlier.

In an exemplary embodiment, the retransmission information further includes a number of attempts towards the second network node, in which case the first network node has transmitted the request message to the second network node, but the request message is rejected by the second network node with a temporary cause code.

In an exemplary embodiment, said property information about the request message is included in a new or existing custom header of the request message, or a message body of the request message.

In an exemplary embodiment, the first network node determines to reselect the third network node based on at least one of facts that:

the first network node cannot reach the second network node, the first network node determines that the second network node is overloaded, or the first network node has transmitted the request message to the second network node as an attempt, but the request message is rejected by the second network node with a temporary cause code.

In an exemplary embodiment, the method further includes: receiving, from the third network node, a response message corresponding to the request message, the response message including an indication of whether the request message is rejected or accepted by the third network node.

In an exemplary embodiment, in a case where a response message including an indication of the request message being rejected by the third network node is received, the response message further includes rejection cause information, which indicates that:

the request message is currently rejected based on facts that the property information about the request message indicates that the request message is involving the reselection at least due to overload control for the second network node, and/or that the third network node cannot retrieve the context from a database where the context is stored, or the request message is rejected and any subsequent request message for contexts related to the same service will be rejected at least based on nature of implementation of the service.

In an exemplary embodiment, the method further includes: storing the rejection cause information included in the received response message for subsequent reselection determination.

In an exemplary embodiment, the request message is an HTTP request message.

In an exemplary embodiment, the first network node functions as a HTTP client for transmitting the request message, and includes at least one of:

an NF service consumer;

an SCP, or an NF service producer.

In an exemplary embodiment, the second network node or the third network node functions as a HTTP server for responding the request message, and includes at least one of:

an NF service consumer;
an SCP, or
an NF service producer.

According to a second aspect of the present disclosure, a method at a third network node (i.e., an alternative Server) for network node reselection for a context related to a service is provided, wherein a first network node (i.e., a Client) has selected a second network node (i.e., a previously selected Server) for providing the service consumed by the first network node, and the context related to the service has been created. The method includes: receiving, from the first network node, a request message for the context, the request message including property information about the request message, determining whether the request message is rejected or accepted at least based on the property information about the request message; and transmitting, to the first network node, a response message including an indication of whether the request message is rejected or accepted.

In an exemplary embodiment, said property information about the request message includes at least one of:

information indicating that the request message is involving a reselection due to a failure of reaching the second network node, information indicating that the request message is involving a reselection due to overload control for the second network node, or information indicating that the request message is involving a reselection due to a temporary rejection from the second network node during a last attempt to the second network node.

In an exemplary embodiment, the overload control for the second network node is performed by the first network node based on overload information of the second network node, wherein the overload information is indicated by OCI that is received from the second network node, or the overload information is derived from a ratio of a number of request messages being rejected by the second network node with a status code against a total number of request messages, wherein the status code is received from the second network node, indicating a request message being rejected by the second network node.

In an exemplary embodiment, said property information about the request message further includes retransmission information indicating that the request message involving the reselection has been transmitted earlier.

In an exemplary embodiment, the retransmission information further includes a number of attempts towards the second network node, in which case the first network node has transmitted the request message to the second network node, but the request message is rejected by the second network node with a temporary cause code.

In an exemplary embodiment, said property information about the request message is included in a new or existing custom header of the request message, or a message body of the request message.

In an exemplary embodiment, the third network node determines whether the request message is rejected or accepted further based on at least one of:

nature of implementation of the requested service, or a fact that the third network node cannot retrieve the context from a database where the context is stored.

In an exemplary embodiment, the third network node transmits the response message including an indication of the request message being rejected, in a case where the third network node determines that the request message is rejected.

In an exemplary embodiment, the response message further includes rejection cause information, which indicates that:

the request message is currently rejected based on facts that the property information about the request message indicates that the request message is involving the reselection at least due to overload control for the second network node, and that the third network node cannot retrieve the context from a database where the context is stored, or the request message is rejected and any subsequent request message for contexts related to the same service will be rejected at least based on nature of implementation of the service.

In an exemplary embodiment, the request message is an HTTP request message.

In an exemplary embodiment, the first network node functions as a HTTP client for transmitting the request message, and includes at least one of:

an NF service consumer;
an SCP, or
an NF service producer.

In an exemplary embodiment, the second network node or the third network node functions as a HTTP server for responding the request message, and includes at least one of:

an NF service consumer;
an SCP, or
an NF service producer.

According to a third aspect of the present disclosure, a first network node (i.e., a Client) is provided. The first network node includes: at least one processor, and at least one memory, storing instructions which, when executed on the at least one processor, cause the first network node to perform any of the methods according to the first aspect of the present disclosure.

According to a fourth aspect of the present disclosure, a third network node (i.e., an alternative Server) is provided. The third network node includes: at least one processor, and at least one memory, storing instructions which, when executed on the at least one processor, cause the third network node to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

The technical solutions of the embodiments of the present disclosure may achieve at least benefits as follows:

allowing the third network node (i.e., the reselected Server) to reject a received request message (as a result of reselection) in a case where it is unable to proceed the request message, based on at least one of reasons that triggers the reselection, e.g., a failure of reaching the second network node (i.e., the previously selected Server), overload control for the second network node, or a temporary rejection from the second network node during a last attempt to the second network node; and by providing a rejection cause of the third network node (i.e., the reselected Server) rejecting the request message of the first network node (i.e., the Client), allowing the first network node to avoid any further reselections for the same rejection cause.

BRIEF DESCRIPTION OF THE DRAWINGS

The objects, advantages and characteristics of the present disclosure will be more apparent, according to descriptions of preferred embodiments in connection with the drawings, in which.

Figure 1:
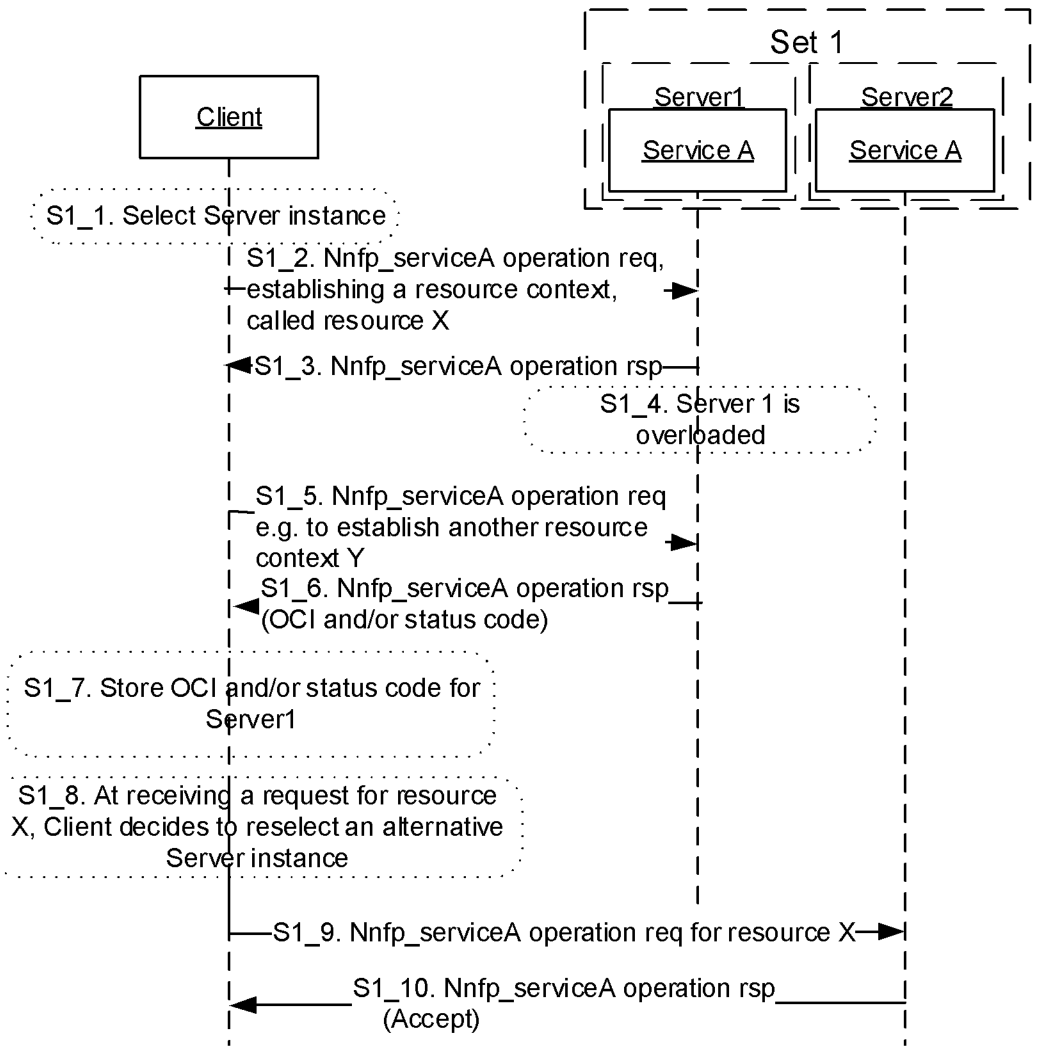
FIG. 1 schematically shows an exemplary reselection process that is triggered by e.g., overload of Server 1 that has previously selected by the Client according to conventional technical solutions.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may include new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may include the first generation (1G), 2G, 3G, 4G, 4.5G, 5G communication protocols, and/or any other protocols either currently known or to be developed in the future.

As used herein, the term "network node" refers to a device in a wireless communication network via which a terminal device or another network node accesses the network and receives services therefrom. The network node refers to an NF, a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "UE" refers to any end device that can access a wireless communication network and receive services therefrom. By way of example and not limitation, the UE refers to a mobile terminal, terminal device, or other suitable devices. The UE may be, for example, a SS (Subscriber Station), a Portable Subscriber Station, a MS (Mobile Station), or an AT (Access Terminal), a relay node. The UE may include, but not limited to, portable computers, image capture terminal devices such as digital cameras, gaming terminal devices, music storage and playback appliances, a mobile phone, a cellular phone, a smart phone, VoIP (voice over IP) phones, wireless local loop phones, a tablet, a wearable device, a PDA (personal digital assistant), portable computers, desktop computer, image capture terminal devices such as digital cameras, gaming terminal devices, music storage and playback appliances, wearable terminal devices, vehicle-mounted wireless terminal devices, wireless endpoints, mobile stations, LEE (laptop-embedded equipment), LME (laptop-mounted equipment), USB dongles, smart devices, wireless CPE (customer-premises equipment) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an IoT (Internet of Things) scenario, a UE may represent a machine or other device that performs monitoring and/or measurements, and transmits the results of such monitoring and/or measurements to another terminal device and/or network equipment. The UE may in this case be a M2M (machine-to-machine) device, which may in a 3GPP context be referred to as a MTC device. As one particular example, the UE may be a terminal device implementing the 3GPP NB-IoT standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

The present disclosure is applied in such a scenario that the Client has selected a Server (e.g., Server 1) for providing a service consumed by the Client, and a context related to the service has been created, but the Client needs to reselect an alternative Server (e.g., Server 2) which is located in the same set as where the Server 1 is located, due to some reasons at the Server 1.

In conjunction with the exemplary reselection process of FIG. 1, the embodiments of the present disclosure may be regarded as being applied under the condition that steps S1_1 to S1_7 of the reselection process as shown in FIG. 1 have been performed. In particular, the embodiments of the present disclosure may especially improve steps S1_9 and S1_10 of the reselection process as shown in FIG. 1.

As previously described, it should be noted that overload of Server 1 is illustrated in FIG. 1 as an exemplary reason for triggering the reselection process only, there may be other possible reasons for triggering the reselection process, such as Server 1 being unreachable, or Server 1 rejecting the request message of the Client with a temporary cause, etc. Any appropriate reasons for triggering the reselection process are applicable to the embodiments of the present disclosure.

The basic ideas of the present disclosure mainly consist in 1) including property information in a request message from the Client to the alternative Server 2, e.g., an HTTP request message. The property information about the request message may include: information indicating that the request message is involving a reselection for the context due to a failure of reaching the Server 1, information indicating that the request message is involving a reselection for the context due to overload control for the Server 1, information indicating that the request message is involving a reselection for the context due to a temporary rejection from the Server 1 during a last attempt to the Server 1, retransmission information indicating that the request message involving the reselection has been retransmitted, etc. As such, the Server 2 may reject the received request message at least based on the property information about the request message; and
2) including rejection cause information in a response message from the Server 2 to the Client, in a case where the request message is rejected by the Server 2. The rejection cause information may indicate that any request message involving server reselection for the context is not supported due to nature of implementation of the requested service, or that the Server 2 cannot retrieve the context from a database where the context is stored. As such, the Client may store the received rejection cause information to avoid any further reselections for the same rejection cause.

Figure 2:
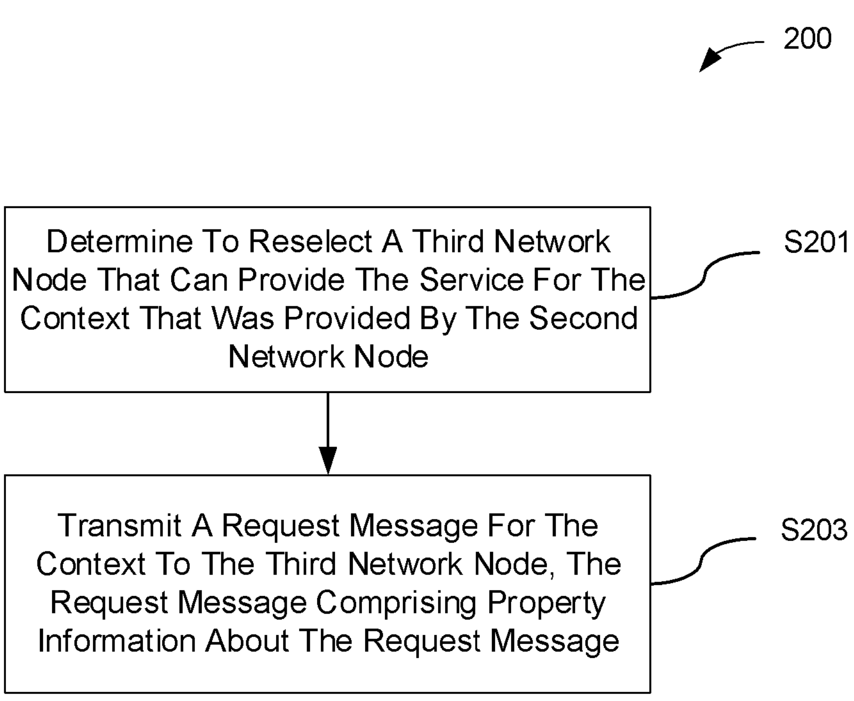
FIG. 2 schematically shows a method at a first network node (i.e., a Client) for network node reselection for existing context according to an exemplary embodiment of the present disclosure.
Figure 3:
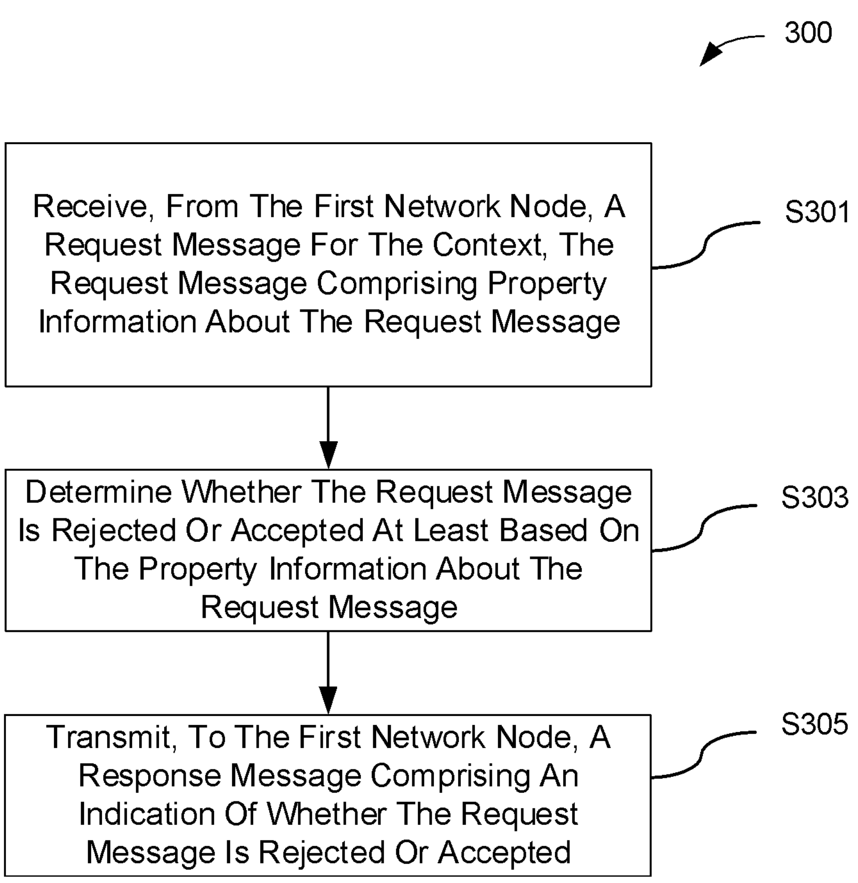
FIG. 3 schematically shows a method at a third network node (i.e., a reselected Server) for network node reselection for existing context according to an exemplary embodiment of the present disclosure.
Figure 4:
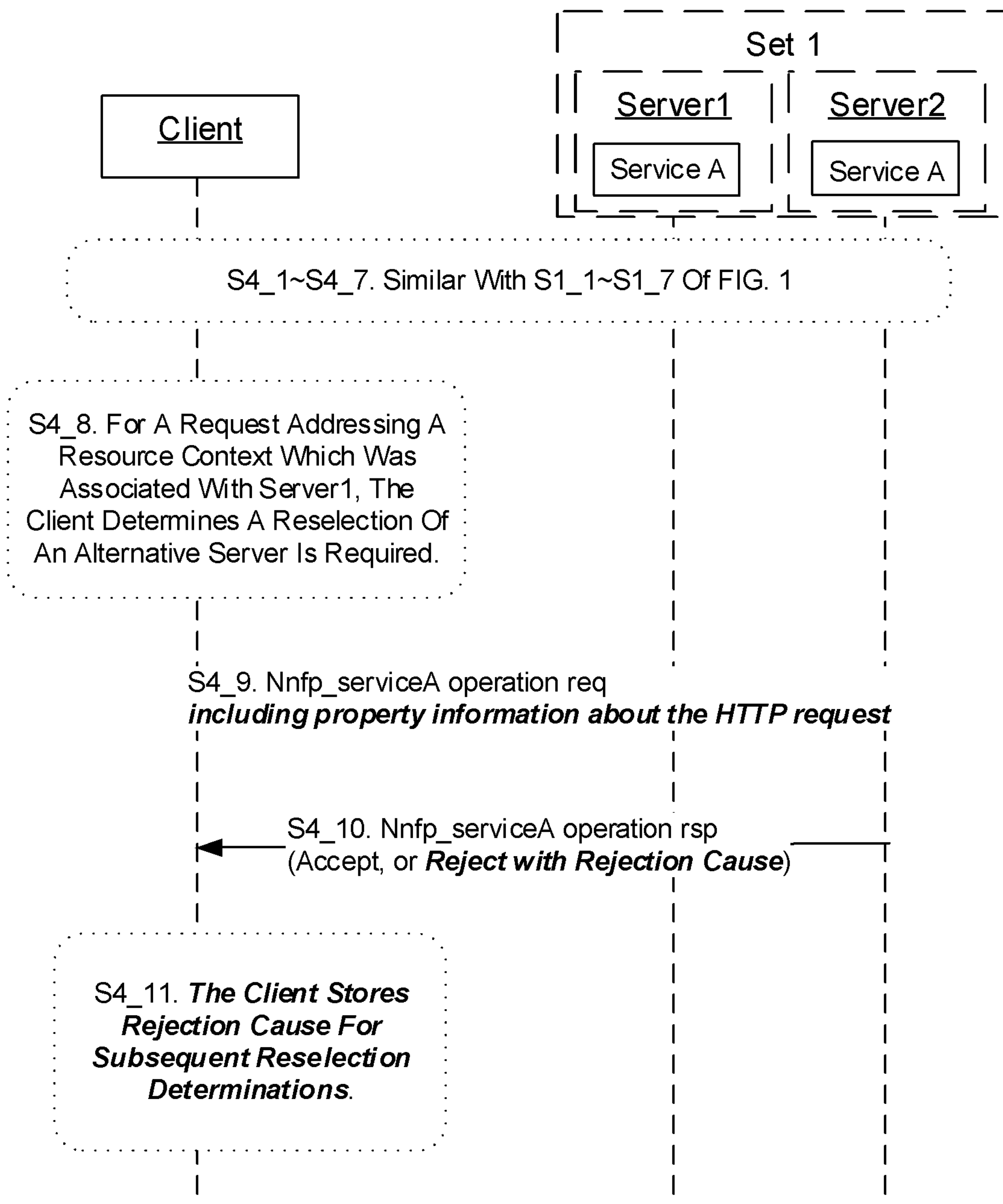
FIG. 4 schematically shows an exemplary reselection process according to an exemplary embodiment of the present disclosure.

The embodiments of the present disclosure will be illustratively described in conjunction with FIGS. 2 to 4.

Hereinafter, a method 200 at a first network node (i.e., a Client) for network node reselection for the existing context according to an exemplary embodiment of the present disclosure will be described with reference to FIG. 2. It should be understood that the first network node, as a Client, may be an NF service consumer, or an SCP e.g. for regular request messages, or an NF service producer e.g. for notification request messages, or similar in other future developments, that transmits a request message, e.g., an HTTP request message.

As previously described, the method 200 is performed in such a scenario that the first network node (i.e., a Client) has selected a second network node (i.e., a previously selected Server, e.g., Server 1) for providing a service consumed by the first network node, and a context related to the service has been created, but the first network node needs to reselect a (alternative) third network node (e.g., Server 2) which is located in the same set as where the second network node is located, due to some reasons (which will be described later) at the second network node.

Accordingly, the second or third network node that receives the request message may be called a "Server", which may refer to an NF service producer, an SCP, an NF service consumer, or similar in other future developments in any appropriate scenarios. For example, an NF service consumer (as a Client), may consume a service provided by an NF service producer (as a Server).

As shown in FIG. 2, the method 200 may include at least steps S201 and S203.

In step S201, the first network node (i.e., a Client) may determine to reselect a third network node in the set where the second network node is located, which can provide the service for the context that was provided by the second network node.

In an exemplary embodiment, upon receiving a request message, e.g. from an upstream network node or a UE, to address the existing context which is related to the service provided by the second network node, the first network node may determine that a reselection is required based on at least one of facts that:

- the first network node cannot reach the second network node, which may be e.g., probed by using "PING"; for example, the first network node cannot reach an original Resource Unified Resource Identifier (URI) in a case where the second network node is an NF producer, or cannot reach a Notification/Callback URI in a case where the second network node is an NF consumer,
- the first network node determines that the second network node is overloaded e.g., by receiving, from the second network node, OCI indicating overload information of the second network node; or by receiving, from the second network node, a status code (e.g., 429/503) indicating a request message being rejected by the second network node, and deriving overload information of the second network node from a ratio of the number of request messages being rejected with the status code by the second network node against a total number of request messages, as specified in "Client-side Adaptive Throttling for Overload Control" in Annex A of 3GPP TS 29.500 V17.1.0 (which is incorporated herein in its entirety by reference), or
- the first network node has transmitted the request message to the second network node as an attempt, but the request message is rejected by the second network node with a temporary cause code.

The first network node may reselect the third network node, which is located in the same set as where the second network node is located, since the context is stored in the common central database, e.g. in the UDSF for the set, which can be accessed by all network nodes in the same set.

Then, in step S203, the first network node may transmit a request message for the context related to the service to the third network node. In particular, a request message is transmitted per context (e.g., per UE, or per Packet Data Unit (PDU) session) related to a service, and a service may be related to at least one context. "a context" or "the context" throughout the present disclosure does not exclude multiple contexts.

The request message may include property information about the request message.

Preferably, the property information about the request message may include at least one of:

- information indicating that the request message is involving a reselection due to a failure of reaching the second network node;
- information indicating that the request message is involving a reselection due to overload control for the second network node; or
- information indicating that the request message is involving a reselection due to a temporary rejection from the second network node during a last attempt to the second network node.

In a case where the property information about the request message includes the information indicating that the request message is involving a reselection due to overload control for the second network node, the overload control for the second network node may be performed by the first network node based on overload information of the second network node. The overload information may be indicated by the OCI that is received from the second network node, or the overload information may be derived from the ratio of a number of request messages being rejected by the second network node with the status code (e.g., 429/503) against the total number of request messages. The status code (e.g., 429/503) may be received from the second network node, indicating a request message being rejected by the second network node.

Alternatively or additionally, the property information about the request message may further include retransmission information indicating whether the request message involving the reselection has been transmitted to the second network node earlier, i.e., whether the first network node has attempted to transmit the request message. For example, a boolean parameter ('True' or 'False') may be used.

In a case where the retransmission information indicates that the request message involving the reselection has been transmitted to the second network node earlier, e.g. 'True', the retransmission information may further include the number of attempts towards the second network node, in which case the first network node has transmitted the request message to the second network node but the request message is rejected by the second network node with a temporary cause code.

For example, the first network node, as a Client, may transmit a request message for the context to e.g. the second network node, such as Server 1, as the first attempt, and transmit a request message for the context to e.g. the third network node, such as Server 2, as the second attempt. Then, the first network node may try the third time, e.g., it may transmit a request message for the context to the third network node or some other network nodes. Here, the request message may include the number of reattempts ('2' in this example) in the property information, since the first network node has tried twice.

The property information about the request message may be included in a new or existing custom header of the request message, or a message body of the request message.

The request message including the related property information as described above may be received by the third network node. The third network node may determine that the request message should be rejected or accepted, based on at least the property information received in the request message, and may transmit, to the first network node, a response message including an indication of whether the request message is rejected or accepted, which will be described later in detail with reference to FIG. 3.

Accordingly in the method 200, the first network node may receive, from the third network node, the response message corresponding to the request message. The response message may include the indication of whether the request message is rejected or accepted by the third network node.

In a case where a response message including an indication of the request message being rejected by the third network node is received, the response message may further include rejection cause information. For example, the rejection cause information may be defined as a certain forms of cause codes.

The rejection cause information received in the response message may indicate to the first network code that the request message for the context is currently rejected and the first network node may reattempt later, e.g., based on facts that the property information about the request message indicates that the request message is involving the reselection at least due to overload control for the second network node, and/or that the third network node cannot retrieve the context from a database where the context is stored, e.g., since the context is locked by the second network node. That is, the rejection is ONLY valid for this request message.

For example, SMF1 is serving a request message for a session from a peer NF, e.g., a PCF, so the context (for the session) in the UDSF may be locked by this SMF1; at the same time, another peer NF, e.g. an AMF, may attempt to contact this overloaded SMF1 for the same context. In such scenario, the AMF (as an example of the first network node) may determine to reselect an alternative SMF, i.e., SMF2 (as an example of the third network node), as it knows that the SMF1 (as an example of the second network node) is overloaded. Thus, when the alternative SMF2 (as an example of the third network node) receives the request message and knows that the corresponding context has been locked by the SMF1 (as an example of the second network node), the SMF2 (as an example of the third network node) rejects the request message, and transmits such rejection cause information based on the above facts to avoid the AMF to redirect the request message to the overloaded SMF1 (as an example of the second network node).

Alternatively or additionally, the rejection cause information received in the response message may indicate to the first network code that the request message is rejected and any subsequent request message for contexts related to the same service will be rejected at least based on nature of implementation of the service. That is, the first network node basically should not reselect the third network node for the request message for contexts related to the same service based on the nature of implementation of the requested service.

For example, for an overloaded AMF (as an example of the second network node), if an alternative AMF (as an example of the third network node) is selected for Namf-_communication service, e.g. for service operation, N1N2Message Transfer, the alternative AMF (as an example of the third network node) may page the UE. However, when the UE answers paging, it will still initiate a service request towards the overloaded AMF (as an example of the second network node). Thus, the alternative AMF (as an example of the third network node) rejects the request message, and transmits such rejection cause information based on nature of implementation of the requested service.

Preferably, the first network node may store the rejection cause information included in the received response message for subsequent reselection determination.

Hereinafter, a method 300 at a third network node (i.e., a reselected Server) for network node reselection for the existing context according to an exemplary embodiment of the present disclosure will be described with reference to FIG. 3. It should be understood that the first network node, as a Client, may be an NF service consumer, or an SCP e.g. for regular request messages, or an NF service producer e.g. for notification request messages, or similar in other future developments, that transmits a request message, e.g., an HTTP request message, and accordingly, the second or third network node that receives the request message may be called a "Server", which may refer to an NF service producer, an SCP, an NF service consumer, or similar in other future developments in any appropriate scenarios. For example, an NF service consumer (as a Client), may consume a service provided by an NF service producer (as a Server).

It should also be understood that the method 300 at the third network node corresponds to the method 200 at the first network node as previously described. Thus, some description of the method 300 may refer to that of method 200, and thus will be omitted for simplicity.

As previously described, the method 300 is performed in such a scenario that the first network node (i.e., a Client) has selected a second network node (i.e., a previously selected Server, e.g., Server 1) for providing a service consumed by the first network node, and a context related to the service has been created, but the first network node needs to reselect a (alternative) third network node (e.g., Server 2) which is located in the same set as where the second network node is located, due to some reasons at the second network node (which have been described previously with reference to FIG. 2). And the first network node determines to select the third network node that can provide the service for the context that was provided by the second network node.

As shown in FIG. 3, the method 300 may include at least steps S301, S303 and S305.

In step S301, the third network node may receive, from the first network node, a request message for the context. The request message may include property information about the request message.

Preferably, the property information about the request message may include at least one of:

- information indicating that the request message is involving a reselection due to a failure of reaching the second network node;
- information indicating that the request message is involving a reselection due to overload control for the second network node, or
- information indicating that the request message is involving a reselection due to a temporary rejection from the second network node during a last attempt to the second network node.

Alternatively or additionally, the property information about the request message may further include retransmission information indicating whether the request message involving the reselection has been transmitted to the second network node earlier, i.e., whether the first network node has attempted to transmit the request message. For example, a boolean parameter ('True' or 'False') may be used.

In a case where the retransmission information indicates that the request message involving the reselection has been transmitted to the second network node earlier, e.g. 'True', the retransmission information may further include the number of attempts towards the second network node, in which case the first network node has transmitted the request message to the second network node but the request message is rejected by the second network node with a temporary cause code.

For example, the first network node, as a Client, may transmit a request message for the context to e.g. the second network node, such as Server 1, as the first attempt, and transmit a request message for the context to e.g. the third network node, such as Server 2, as the second attempt. Then, the first network node may try the third time, e.g., it may transmit a request message for the context to the third network node or some other network nodes. Here, the request message may include the number of reattempts ('2' in this example) in the property information, since the first network node has tried twice.

The property information about the request message may be included in a new or existing custom header of the request message, or a message body of the request message.

In step S303, the third network node may determine whether the request message is rejected or accepted at least based on the property information about the request message.

Preferably, the third network node may determine whether the request message is rejected or accepted based on at least one of: the property information about the request message, nature of implementation of the requested service, or a fact that the third network node cannot retrieve the context from the database where the context is stored.

For example, the third network node may determine to reject the request message, based on the received property information indicating that the request message is involving the reselection due to overload control for the second network node, and the fact that the third network node cannot retrieve the context from the database where the context is stored, e.g., since the context is locked by the second network node. That is, the rejection is ONLY valid for this request message. As a particular example in this case, SMF1 is serving a request message for a session from a peer NF, e.g., a PCF, so the context (for the session) in the UDSF may be locked by this SMF1; at the same time, another peer NF, e.g. an AMF, may attempt to contact this overloaded SMF1 for the same context. In such scenario, the AMF (as an example of the first network node) may determine to reselect an alternative SMF, i.e., SMF2 (as an example of the third network node), as it knows that the SMF1 (as an example of the second network node) is overloaded. Thus, when the alternative SMF2 (as an example of the third network node) receives the request message and knows that the corresponding context has been locked by the SMF1 (as an example of the second network node), the SMF2 (as an example of the third network node) rejects the request message, and transmits such rejection cause information based on the above facts to avoid the AMF to redirect the request message to the overloaded SMF1 (as an example of the second network node).

For another example, the third network node may determine to reject the request message, based on the received property information indicating that the request message is involving the reselection due to overload control for the second network node and the nature of implementation of the service. That is, the third network node always rejects the request message for contexts related to the same service due to the nature of implementation of the requested service. As a particular example in this case, for an overloaded AMF (as an example of the second network node), if an alternative AMF (as an example of the third network node) is selected for Namf_communication service, e.g. for service operation, N1N2Message Transfer, the alternative AMF (as an example of the third network node) may page the UE. However, when the UE answers paging, it will still initiate a service request towards the overloaded AMF (as an example of the second network node). Thus, the alternative AMF (as an example of the third network node) always rejects the request message for contexts related to the same service due to the nature of implementation of the requested service.

In step S305, the third network node may transmit, to the first network node, a response message including an indication of whether the request message is rejected or accepted.

In a case where the third network node determines that the request message is rejected as described previously in step S303, the third network node may transmit the response message including an indication of the request message being rejected.

In this case, the response message may further include rejection cause information. For example, the rejection cause information may be defined as a certain forms of cause codes.

As previously described with reference to FIG. 2, the rejection cause information may indicate to the first network code that the request message for the context is currently rejected and the first network node may reattempt later, e.g., based on facts that the property information about the request message indicates that the request message is involving the reselection at least due to overload control for the second network node, and/or that the third network node cannot retrieve the context from a database where the context is stored, e.g., since the context is locked by the second network node. That is, the rejection is ONLY valid for this request message.

Alternatively or additionally, the rejection cause information may indicate to the first network code that the request message is rejected and any subsequent request message for contexts related to the same service will be rejected at least based on nature of implementation of the service. That is, the rejection cause information may indicate to the first network node that the first network node basically should not reselect the third network node for the request message for contexts related to the same service based on the nature of implementation of the requested service.

Hereinafter, an exemplary signaling sequence diagram of an exemplary reselection process according to an exemplary embodiment of the present disclosure will be described with reference to FIG. 4, in which the method 200 at the first network node and the method 300 at the third network node for network node reselection according to exemplary embodiments of the present disclosure are applied.

It should be noted that the description below mainly focuses on signaling related to the methods 200 and 300, and some other signaling is not described in detail to avoid obscuring the principle of the present disclosure, such as steps S4_1 to S4_7, which may be similar with steps S1_1 to S1_7 of the reselection process as shown in FIG. 1. In FIG. 4, modification on the signaling related to the methods 200 and 300 is shown in Bold Italics, in which steps S4_9 to S4_11 are involved.

During steps S4_1 to S4_7, the Client has selected the Server 1 in this example for providing e.g., Service A consumed by the Client, and a context related to the Service A has been created. However, some events related to the Server 1 occur, e.g., overload of Server 1, or Server 1 being unreachable, or Server 1 rejecting the request message of the Client with a temporary cause etc.

In S4_8, the Client may receive a request message for a (resource) context related to the Server 1, e.g. from an upstream NF or a UE. The Client may determine that a reselection of an alternative Server is required based on at least one of facts that:

- the Client cannot reach the Server 1, which may be e.g., probed by using "PING"; for example, the Client cannot reach an original Resource Unified Resource Identifier (URI) in a case where the Server 1 is an NF producer, or cannot reach a Notification/Callback URI in a case where the Server 1 is an NF consumer,
- the Client determines that the Server 1 is overloaded e.g., by receiving, from the second network node, OCI indicating overload information of the second network node; or by receiving, from the second network node, a status code (e.g., 429/503) indicating a request message being rejected by the second network node, and deriving overload information of the second network node from a ratio of the number of request messages being rejected with the status code by the second network node against a total number of request messages, as specified in "Client-side Adaptive Throttling for Overload Control" in Annex A of 3GPP TS 29.500 V17.1.0, or
- the Client has transmitted the request message to the Server 1 as an attempt, but the request message is rejected by the Server 1 with a temporary cause code.

The Client may reselect the Server 2, which is located in the same set as where the Server 1 is located, since the context is stored in the common central database, e.g. in the UDSF for the set, which can be accessed by all servers in the same set.

In S4_9, the Client may transmit a request message for the context (e.g., Nnfp_serviceA operation request) to the Server 2. The request message may include property information about the request message, which may include at least one of:

- information indicating that the request message is involving a reselection due to a failure of reaching the Server 1;
- information indicating that the request message is involving a reselection due to overload control for the Server 1; or
- information indicating that the request message is involving a reselection due to a temporary rejection from the Server 1 during a last attempt to the Server 1.

The property information about the request message may further include retransmission information indicating whether the request message involving the reselection has been transmitted to the Server 1 earlier, i.e., whether the Client has attempted to transmit the request message. For example, a boolean parameter ('True' or 'False') may be used.

In a case where the retransmission information indicates that the request message involving the reselection has been transmitted to the Server 1 earlier, e.g. 'True', the retransmission information may further include the number of attempts towards the Server 1, in which case the Client has transmitted the request message to the Server 1 but the request message is rejected by the Server 1 with a temporary cause code.

The Server 2 may determine whether the received request message is rejected or accepted at least based on the property information about the request message based on at least one of: the property information about the request message, nature of implementation of the requested Service A, or a fact that the Server 2 cannot retrieve the context from the database where the context is stored.

For example, the Server 2 may determine to reject the request message, based on the received property information indicating that the request message is involving the reselection due to overload control for the Server 1, and the fact that the Server 2 cannot retrieve the context from the database where the context is stored, e.g., since the context is locked by the Server 1. That is, the rejection is ONLY valid for this request message.

For another example, the Server 2 may determine to reject the request message, based on the received property information indicating that the request message is involving the reselection due to overload control for the Server 1 and the nature of implementation of the Service A. That is, the Server 2 always rejects the request message for contexts related to the same Service A due to the nature of implementation of the requested Service A.

In a case where the Server 2 determines that the request message is rejected, the Server 2 may include corresponding rejection cause information in a response message.

The rejection cause information may indicate to the Client that the request message for the context is currently rejected and the Client may reattempt later, e.g., based on facts that the property information about the request message indicates that the request message is involving the reselection at least due to overload control for the Server 1, and/or that the Server 2 cannot retrieve the context from a database where the context is stored, e.g., since the context is locked by the Server 1. That is, the rejection is ONLY valid for this request message.

Alternatively or additionally, the rejection cause information may indicate to the Client that the request message is rejected and any subsequent request message for contexts related to the same Service A will be rejected at least based on nature of implementation of the Service A. That is, the rejection cause information may indicate to the Client that the Client basically should not reselect the Server 2 for the request message for contexts related to the same Service A based on the nature of implementation of the requested Service A.

Then in S4_10, the Server 2 may transmit the response message (e.g., Nnfp_serviceA operation response) to the Client. The response message may include an indication of the request message being accepted (e.g., 'Accept').

Alternatively, the response message may include an indication of the request message being rejected (e.g., "Reject") as well as the corresponding rejection cause as described previously.

After receiving the response message with the indication of the request message being rejected and the corresponding rejection cause, in S4_11, the Client may store the rejection cause information included in the received response message for subsequent reselection determination to avoid any further reselections of the Server 2 for the same rejection cause.

The exemplary procedure as shown in FIG. 4 relates to modifications on e.g., following sections in 3GPP TS 29.500 v17.1.0, which are shown in Underlined.

First Change 5.2.3.3 Optional to support custom headers 5.2.3.3.1 General

The 3GPP NF Services may support the HTTP custom headers specified in Table 5.2.3.3-1 below. A description of each custom header and the normative requirements on when to include them are also provided in Table 5.2.3.3-1.

TABLE 5.2.3.3-1

| Optional HTTP custom headers | | |
|---|---|---|
| Name | Reference | Description |
| 3gpp-Sbi-Sender-Timestamp | Clause 5.2.3.3.2 | This header may be used to indicate the date and time (with a millisecond granularity) at which an HTTP request or response is originated. This may be used e.g. for measuring signalling delays between different NF service instances. |
| 3gpp-Sbi-Max-Rsp-Time | Clause 5.2.3.2.3 | This header may be used in a HTTP request to indicate the duration during which the HTTP client waits for a response. See clause 6.11.2. |
| 3gpp-Sbi-Alternate-Chf-Id | Clause 5.2.3.2.3.4 | This header may be used to indicate a primary or secondary CHF instance, e.g. when using indirect communication with delegated discovery. See clause 6.10.3.x. |
| 3gpp-Sbi-Request-Property | Clause 5.2.3.2.x | This header may be used to indicate additional information related to a HTTP request, e.g. if the request is involving a reselection towards an alternative NF, and/or if the request is a retransmission of a request towards an (alternative) NF. |

Next Change 5.2.3.2.x 3gpp-Sbi-Request-Property

The header contains the additional information related to a HTTP request message, e.g. when the HTTP request message is to address an existing resource/session context and if the HTTP request is a redirected towards an alternative NF.

The encoding of the header follows the ABNF as defined in IETF RFC 7230 [12].

3gpp-Sbi-Request-Property="3gpp-Sbi-Request-Property" ":" OWS "retrans=" retransvalue 1*(";"
OWS parameter [(";" OWS receivedrejectioncause])
retransvalue="true"/"false"
parameter=parametername "=" token
parametername="reason"
reason="reason"=OWS cause The following parameters are defined:

reason: indicates the reason for which the NF resend or redirect the HTTP request message. This may take one of the following values:

"unreachable": indicates that the HTTP request is redirected to an alternative NF due to the request URI (e.g. the resource URI or Notification/callback URI) is not reachable;

"overloaded": indicates that the HTTP request is redirected to an alternative NF as result of overload control enforcement, by doing redirection towards an alternative NF (see clause 6.4.3.5.1);

"temporary-rejection-cause": indicates the HTTP request is retransmitted towards the same or alternative NF due to a temporary rejection.

receivedrejectioncause: indicates a temporary rejection cause received from the NF (for last attempt) as defined in clause 5.2.7.2, when the retransvalue is set to "true" and the reason is set to "temporary-rejection-cause". The cause data type is specified in clause 5.2.4.1 of 3GPP TS 29.571 [13].

Next Change 6.4.1 General

Service Based Interfaces use HTTP/2 over TCP for communication between the NF Services. TCP provides transport level congestion control mechanisms as specified in IETF RFC 5681 [16], which may be used for congestion control between two TCP endpoints (i.e., hop by hop). HTTP/2 also provides flow control mechanisms and limitation of stream concurrency that may be configured for connection level congestion control, as specified in IETF RFC 7540 [7].

In addition to TCP and HTTP/2 congestion control mechanisms, the following end to end application-level overload control mechanisms are defined.

Overload control enables an NF Service Producer, an NF Service Consumer or an SCP becoming or being overloaded to gracefully reduce its incoming signalling load, by instructing NF Service Consumers to reduce sending service requests or by instructing NF Service Producers to reduce sending notification requests respectively, according to its available signalling capacity to successfully process the requests. An NF Service Producer, NF Service Consumer or SCP is in overload when it operates over its signalling capacity.

When being instructed by a NF Service Consumer to apply overload control, the NF Service Producer shall perform the signaling reduction towards the NF Service Consumer only for the notifications or callback requests according to the overload scope, and not for any NF services which may be produced by the same NF (for which separate OCI may be advertised by the NF when acting as NF producer), even when the overload scope is on NF Instance level or NF Set level.

Overload control aims at shedding the incoming traffic as close to the traffic source as possible generally when an overload has occurred (reactive action), so to avoid spreading the problem inside the network and to avoid using resources of intermediate entities in the network for signalling that cannot anyhow be served by the overloaded entity.

Overload control should continue to allow for preferential treatment of priority users (e.g. MPS) and emergency services.

Overload control may be performed based on HTTP status codes returned in HTTP responses (as defined in clause 6.4.2) or based on Overload Control Information (OCI) signalled in HTTP request or response (as defined in clause 6.4.2).

The NF that performs overload control enforcement, may either throttle a fraction of request messages, or redirect some request messages towards an alternative NF if possible, to reduce sending HTTP requests towards an overloaded NF. (see clause 6.4.3.5)

Next Change 6.4.3.5.1 Message Throttling

As part of the overload mitigation, the overload control enforcement NE, i.e. an entity that receives OCI (with a non-null overload reduction metric), shall reduce the total number of request messages, which would have been sent otherwise, towards the overloaded peer(s) corresponding to the received scope, e.g. towards all the NF instances of the NF Set when the scope indicates an NF Set ID and shall not redirect its requests to another entity pertaining to the same scope.

This shall be achieved by discarding a fraction of the request messages in proportion to the overload level of the peer, which is called request message throttling; or redirecting some of request messages to an alternative NF if possible, e.g. when the binding entity for reselection is larger than the overload scope.

When redirecting the request towards an alternative NF to address an existing resource/session context, the NF may include a 3gpp-Sbi-Request-Property header to indicate the request is redirected to an alternative NF as result of overload enforcement. (See clause 5.2.3.2.x)

Message throttling shall apply to HTTP requests only (any service request including notification request).

Network Functions shall support and use the "Loss" algorithm as specified in clause 6.4.3.5.2.

For Information 6.4.3.5.2 Loss Algorithm

An overloaded NF Service Producer/Consumer/SCP shall ask its peers to reduce the number of HTTP requests they would otherwise send by conveying in the OCI header the requested traffic reduction percentage within the Overload Reduction Metric parameter, as specified in clause 6.4.3.4.3.

The recipients of the Overload Reduction Metric shall reduce the number of request messages by that percentage, either by redirecting them to an alternate destination if possible (e.g. an HTTP POST request for the Nsmf_PDUSession_CreateSMContext service operation can be sent to an alternate SMF in the same SMF set, if the olcScope is at the NF instance level and the binding indication of the service resource is for an SMF set), or by failing the request and treating it as if it was rejected by the destination entity.

NOTE: For example, if an NF Service Producer/Consumer/SCP requests a peer to reduce the traffic by 10%, then that peer throttles 10% of the traffic that would have otherwise been sent to this NF Service Producer/Consumer/SCP.

End of Change

Figure 5:
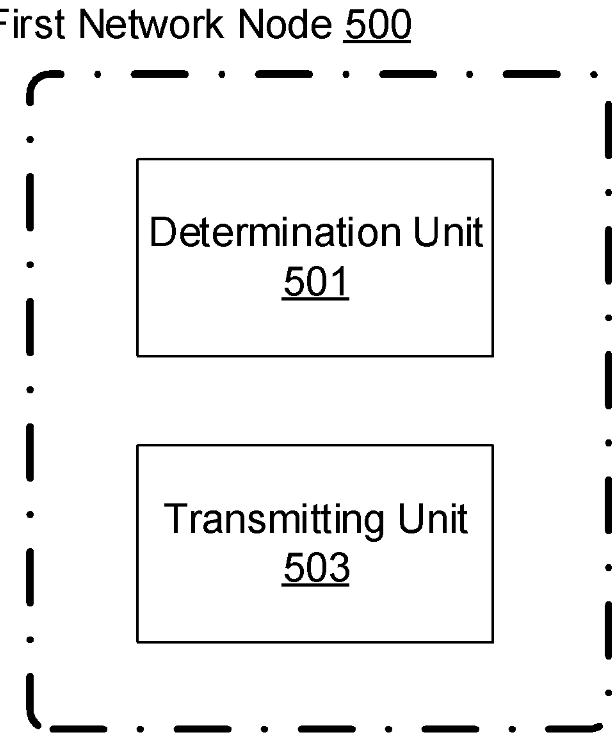
FIG. 5 schematically shows a structural block diagram of a first network node (i.e., a Client) according to an exemplary embodiment of the present disclosure.

Hereinafter, a structure of a first network node according to an exemplary embodiment of the present disclosure will be described with reference to FIG. 5. FIG. 5 schematically shows a block diagram of the node 500 according to an exemplary embodiment of the present disclosure. The first network node 500 in FIG. 5 may perform the method 200 as described previously with reference to FIG. 2. Accordingly, some detailed description on the first network node 500 may refer to the corresponding description of the method 200 in FIG. 2 and the signaling sequence diagram of FIG. 4 as previously discussed, and thus will be omitted here for simplicity.

As previously described, the first network node, as a Client, may be an NF service consumer, or an SCP e.g. for regular request messages, or an NF service producer e.g. for notification request messages, or similar in other future developments, that transmits a request message, e.g., an HTTP request message, and accordingly, the second or third network node that receives the request message may be called a "Server", which may refer to an NF service producer, an SCP, an NF service consumer, or similar in other future developments in any appropriate scenarios. For example, an NF service consumer (as a Client), may consume a service provided by an NF service producer (as a Server).

As shown in FIG. 5, the first network node 500 may include a determination unit 501 and a transmitting unit 503.

The determination unit 501 may be configured to determine to reselect a third network node that can provide the service for the context that was provided by the second network node.

Preferably, the determination unit 501 may be further configured to determine to reselect the third network node based on at least one of facts that:

- the first network node 500 cannot reach the second network node,
- the first network node 500 determines that the second network node is overloaded, or
- the first network node 500 has transmitted the request message to the second network node as an attempt, but the request message is rejected by the second network node with a temporary cause code.

The transmitting unit 503 may be configured to transmit a request message for the context to the third network node, the request message including property information about the request message.

As previously described, the property information about the request message includes at least one of:

- information indicating that the request message is involving a reselection due to a failure of reaching the second network node,
- information indicating that the request message is involving a reselection due to overload control for the second network node, or
- information indicating that the request message is involving a reselection due to a temporary rejection from the second network node during a last attempt to the second network node.

In an exemplary embodiment, the first network node 500 may further include an overload control unit (not shown), which may be configured to perform overload control for the second network node based on overload information of the second network node.

The overload information may be indicated by OCI that is received from the second network node, or may be derived from the ratio of a number of request messages being rejected by the second network node with a status code against the total number of request messages, wherein the status code is received from the second network node, indicating a request message being rejected by the second network node.

In an exemplary embodiment, the property information about the request message may further include retransmission information indicating that the request message involving the reselection has been transmitted to the second network node earlier.

Alternatively or additionally, the retransmission information may further include the number of attempts towards the second network node, in which case the first network node 500 has transmitted the request message to the second network node, but the request message is rejected by the second network node with a temporary cause code.

In an exemplary embodiment, the first network node 500 may further include a receiving unit (not shown), which may be configured to receive, from the third network node, a response message corresponding to the request message, the response message including an indication of whether the request message is rejected or accepted by the third network node.

In a case where a response message including an indication of the request message being rejected by the third network node is received, the response message may further include rejection cause information, which may indicate that:

- the request message is currently rejected based on facts that the property information about the request message indicates that the request message is involving the reselection at least due to overload control for the second network node, and/or that the third network node cannot retrieve the context from a database where the context is stored, or
- the request message is rejected and any subsequent request message for contexts related to the same service will be rejected at least based on nature of implementation of the service.

Alternatively or additionally, the first network node 500 may further include a storage unit (not shown), which may be configured to store the rejection cause information included in the received response message for subsequent reselection determination.

Figure 6:
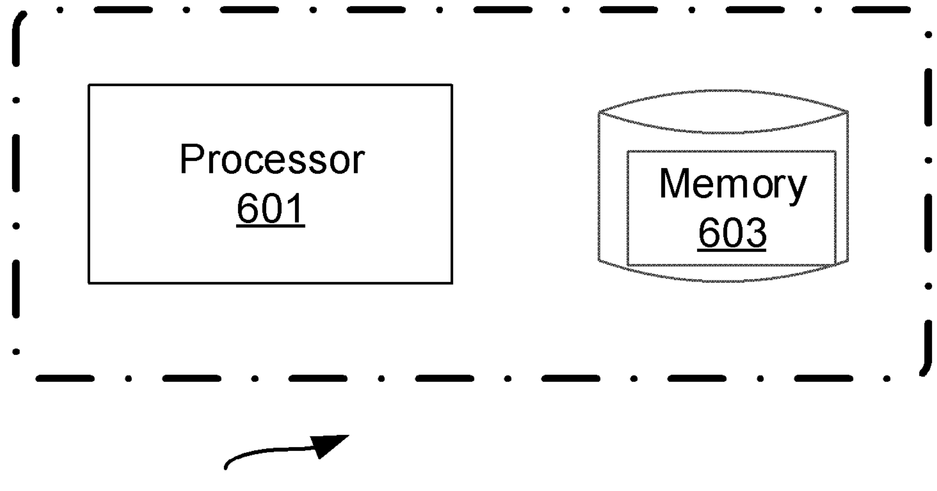
FIG. 6 schematically shows a structural block diagram of a first network node (i.e., a Client) according to another exemplary embodiment of the present disclosure.

Hereinafter, a structure of a first network node according to another exemplary embodiment of the present disclosure will be described with reference to FIG. 6. FIG. 6 schematically shows a block diagram of a first network node 600 according to an exemplary embodiment of the present disclosure. The node 600 in FIG. 6 may perform the method 200 as described previously with reference to FIG. 2. Accordingly, some detailed description on the first network node 600 may refer to the corresponding description of the method 200 in FIG. 2 and the signaling sequence diagram of FIG. 4 as previously discussed, and thus will be omitted here for simplicity.

As previously described, the first network node, as a Client, may be an NF service consumer, or an SCP e.g. for regular request messages, or an NF service producer e.g. for notification request messages, or similar in other future developments, that transmits a request message, e.g., an HTTP request message, and accordingly, the second or third network node that receives the request message may be called a "Server", which may refer to an NF service producer, an SCP, an NF service consumer, or similar in other future developments in any appropriate scenarios. For example, an NF service consumer (as a Client), may consume a service provided by an NF service producer (as a Server).

As shown in FIG. 6, the first network node 600 includes at least one processor 601 and at least one memory 603. The at least one processor 601 includes e.g., any suitable CPU (Central Processing Unit), microcontroller, DSP (Digital Signal Processor), etc., capable of executing computer program instructions. The at least one memory 603 may be any combination of a RAM (Random Access Memory) and a ROM (Read Only Memory). The at least one memory 603 may also include persistent storage, which, for example, can be any single one or combination of magnetic memory, optical memory, or solid state memory or even remotely mounted memory.

The at least one memory 603 stores instructions executable by the at least one processor 601. The instructions, when loaded from the at least one memory 603 and executed on the at least one processor 601, may cause the first network node 600 to perform the actions, e.g., of the procedures as described earlier respectively in conjunction with FIGS. 2 and 4, and thus will be omitted here for simplicity.

Figure 7:
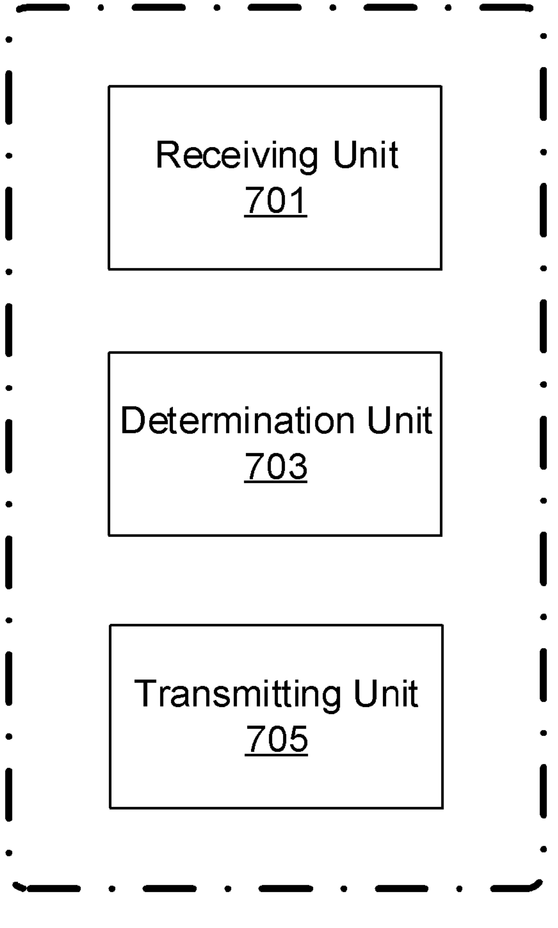
FIG. 7 schematically shows a structural block diagram of a third network node (i.e., a reselected Server) according to an exemplary embodiment of the present disclosure.

Hereinafter, a structure of a third network node according to an exemplary embodiment of the present disclosure will be described with reference to FIG. 7. FIG. 7 schematically shows a block diagram of the third network node 700 according to an exemplary embodiment of the present disclosure. The third network node 700 in FIG. 7 may perform the method 300 as described previously with reference to FIG. 3. Accordingly, some detailed description on the third network node 700 may refer to the corresponding description of the method 300 in FIG. 3 and the signaling sequence diagram of FIG. 4 as previously discussed, and thus will be omitted here for simplicity.

As previously described, the first network node, as a Client, may be an NF service consumer, or an SCP e.g. for regular request messages, or an NF service producer e.g. for notification request messages, or similar in other future developments, that transmits a request message, e.g., an HTTP request message, and accordingly, the second or third network node that receives the request message may be called a "Server", which may refer to an NF service producer, an SCP, an NF service consumer, or similar in other future developments in any appropriate scenarios. For example, an NF service consumer (as a Client), may consume a service provided by an NF service producer (as a Server).

As shown in FIG. 7, the third network node 700 may include a receiving unit 701, a determination unit 703, and a transmitting unit 705.

The receiving unit 701 may be configured to receive, from the first network node, a request message for the context, the request message including property information about the request message.

As previously described, the property information about the request message includes at least one of:

- information indicating that the request message is involving a reselection due to a failure of reaching the second network node,
- information indicating that the request message is involving a reselection due to overload control for the second network node, or
- information indicating that the request message is involving a reselection due to a temporary rejection from the second network node during a last attempt to the second network node.

In an exemplary embodiment, the property information about the request message may further include retransmission information indicating that the request message involving the reselection has been transmitted to the second network node earlier.

Alternatively or additionally, the retransmission information may further include the number of attempts towards the second network node, in which case the first network node 500 has transmitted the request message to the second network node, but the request message is rejected by the second network node with a temporary cause code.

The determination unit 703 may be configured to determine whether the request message is rejected or accepted at least based on the property information about the request message.

Preferably, the determination unit 703 may be further configured to determine whether the request message is rejected or accepted based on at least one of: the property information about the request message, nature of implementation of the requested service, or a fact that the third network node cannot retrieve the context from the database where the context is stored.

The transmitting unit 705 may be configured to transmit, to the first network node, a response message including an indication of whether the request message is rejected or accepted.

In a case where the determination unit 703 determines that the request message is rejected as described previously, the transmitting unit 705 may be further configured to transmit the response message including an indication of the request message being rejected.

In this case, the response message may further include rejection cause information. For example, the rejection cause information may be defined as a certain forms of cause codes.

The rejection cause information may indicate to the first network code that the request message for the context is currently rejected and the first network node may reattempt later, e.g., based on facts that the property information about the request message indicates that the request message is involving the reselection at least due to overload control for the second network node, and/or that the third network node cannot retrieve the context from a database where the context is stored, e.g., since the context is locked by the second network node. That is, the rejection is ONLY valid for this request message.

Alternatively or additionally, the rejection cause information may indicate to the first network code that the request message is rejected and any subsequent request message for contexts related to the same service will be rejected at least based on nature of implementation of the service. That is, the rejection cause information may indicate to the first network node that the first network node basically should not reselect the third network node for the request message for contexts related to the same service based on the nature of implementation of the requested service.

Figure 8:
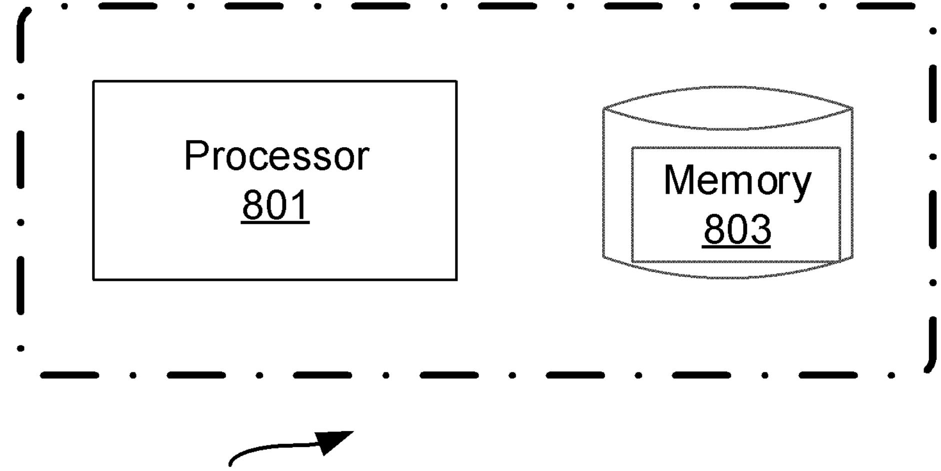
FIG. 8 schematically shows a structural block diagram of a third network node (i.e., a reselected Server) according to another exemplary embodiment of the present disclosure.

Hereinafter, a structure of a third network node according to another exemplary embodiment of the present disclosure will be described with reference to FIG. 8. FIG. 8 schematically shows a block diagram of a third network node 800 according to an exemplary embodiment of the present disclosure. The third network node 800 in FIG. 8 may perform the method 300 as described previously with reference to FIG. 3. Accordingly, some detailed description on the third network node 800 may refer to the corresponding description of the method 300 in FIG. 3 and the signaling sequence diagram of FIG. 4 as previously discussed, and thus will be omitted here for simplicity.

As previously described, the first network node, as a Client, may be an NF service consumer, or an SCP e.g. for regular request messages, or an NF service producer e.g. for notification request messages, or similar in other future developments, that transmits a request message, e.g., an HTTP request message, and accordingly, the second or third network node that receives the request message may be called a "Server", which may refer to an NF service producer, an SCP, an NF service consumer, or similar in other future developments in any appropriate scenarios. For example, an NF service consumer (as a Client), may consume a service provided by an NF service producer (as a Server).

As shown in FIG. 8, the third network node 800 includes at least one processor 801 and at least one memory 803. The at least one processor 801 includes e.g., any suitable CPU (Central Processing Unit), microcontroller, DSP (Digital Signal Processor), etc., capable of executing computer program instructions. The at least one memory 803 may be any combination of a RAM (Random Access Memory) and a ROM (Read Only Memory). The at least one memory 803 may also include persistent storage, which, for example, can be any single one or combination of magnetic memory, optical memory, or solid state memory or even remotely mounted memory.

The at least one memory 803 stores instructions executable by the at least one processor 801. The instructions, when loaded from the at least one memory 803 and executed on the at least one processor 801, may cause the third network node 800 to perform the actions, e.g., of the procedures as described earlier respectively in conjunction with FIGS. 3 and 4, and thus will be omitted here for simplicity.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 601 causes the first network node 600 to perform the actions, e.g., of the procedure described earlier in conjunction with FIGS. 2 and 4; or code/computer readable instructions, which when executed by the at least one processor 801 causes the third network node 800 to perform the actions, e.g., of the procedures described earlier respectively in conjunction with FIGS. 3 and 4.

The computer program product may be configured as a computer program code structured in computer program modules. The computer program modules could essentially perform the actions of the flow illustrated in any of FIGS. 2 to 4.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method at a first network node for network node reselection for a context related to a service, wherein the first network node has selected a second network node for providing the service consumed by the first network node, and the context related to the service has been created, the method comprising:

determining to reselect a third network node that can provide the service for the context that was provided by the second network node; and transmitting a request message for the context to the third network node, the request message comprising property information about the request message;

wherein said property information about the request message comprises at least one of:

information indicating that the request message is involving a reselection due to a failure of reaching the second network node, information indicating that the request message is involving a reselection due to overload control for the second network node, or information indicating that the request message is involving a reselection due to a temporary rejection from the second network node during a last attempt to the second network node.

2. The method of claim 1, wherein the overload control for the second network node is performed by the first network node based on overload information of the second network node, wherein the overload information is indicated by Overload Control Information (OCI) that is received from the second network node, or the overload information is derived from a ratio of a number of request messages being rejected by the second network node with a status code against a total number of request messages, wherein the status code is received from the second network node, indicating a request message being rejected by the second network node.

3. The method of claim 1, wherein said property information about the request message further comprises retransmission information indicating that the request message involving the reselection has been transmitted to the second network node earlier.

4. The method of claim 3, wherein the retransmission information further comprises a number of attempts towards the second network node, in which case the first network node has transmitted the request message to the second network node, but the request message is rejected by the second network node with a temporary cause code.

5. The method of claim 1, wherein the first network node determines to reselect the third network node based on at least one of:

the first network node cannot reach the second network node, the first network node determines that the second network node is overloaded, or the first network node has transmitted the request message to the second network node as an attempt, but the request message is rejected by the second network node with a temporary cause code.

6. The method of claim 1, further comprising:

receiving, from the third network node, a response message corresponding to the request message, the response message comprising an indication of whether the request message is rejected or accepted by the third network node.

7. The method of claim 6, wherein in a case where the response message comprising an indication of the request message being rejected by the third network node is received, the response message further comprises rejection cause information, which indicates that:

the request message is currently rejected based on facts that the property information about the request message indicates that the request message is involving the reselection at least due to overload control for the second network node, and/or that the third network node cannot retrieve the context from a database where the context is stored, or the request message is rejected and any subsequent request message for contexts related to the same service will be rejected at least based on nature of implementation of the service.

8. The method of claim 7, further comprising:

storing the rejection cause information comprised in the received response message for subsequent reselection determination.

9. The method of claim 1, wherein the request message is a Hypertext Transfer Protocol (HTTP) request message.

10. The method of claim 1, wherein the first network node functions as a Hypertext Transfer Protocol (HTTP) client for transmitting the request message, and comprises at least one of:

a Network Function (NF) service consumer, a Service Communication Proxy (SCP), or an NF service producer.

11. The method of claim 10, wherein the second network node or the third network node functions as a HTTP server for responding the request message, and comprises at least one of:

an NF service consumer;

an SCP, or an NF service producer.

12. A method at a third network node for network node reselection for a context related to a service, wherein a first network node has selected a second network node for providing the service consumed by the first network node, and the context related to the service has been created, the method comprising:

receiving, from the first network node, a request message for the context, the request message comprising property information about the request message, wherein said property information about the request message comprises at least one of:

information indicating that the request message is involving a reselection due to a failure of reaching the second network node, information indicating that the request message is involving a reselection due to overload control for the second network node, or information indicating that the request message is involving a reselection due to a temporary rejection from the second network node during a last attempt to the second network node;

determining whether the request message is rejected or accepted at least based on the property information about the request message; and transmitting, to the first network node, a response message comprising an indication of whether the request message is rejected or accepted.

13. The method of claim 12, wherein the overload control for the second network node is performed by the first network node based on overload information of the second network node, wherein the overload information is indicated by Overload Control Information (OCI) that is received from the second network node, or the overload information is derived from a ratio of a number of request messages being rejected by the second network node with a status code against a total number of request messages, wherein the status code is received from the second network node, indicating a request message being rejected by the second network node.

14. The method of claim 12, wherein said property information about the request message further comprises retransmission information indicating that the request message involving the reselection has been transmitted earlier.

15. The method of claim 14, wherein the retransmission information further comprises a number of attempts towards the second network node, in which case the first network node has transmitted the request message to the second network node, but the request message is rejected by the second network node with a temporary cause code.

16. The method of claim 12, wherein the third network node determines whether the request message is rejected or accepted further based on at least one of:

nature of implementation of the requested service, or a fact that the third network node cannot retrieve the context from a database where the context is stored.

17. The method of claim 12, wherein the third network node transmits the response message comprising an indication of the request message being rejected, in a case where the third network node determines that the request message is rejected.

18. The method of claim 17, wherein the response message further comprises rejection cause information, which indicates that:

the request message is currently rejected based on facts that the property information about the request message indicates that the request message is involving the reselection at least due to overload control for the second network node, and/or that the third network node cannot retrieve the context from a database where the context is stored, or the request message is rejected and any subsequent request message for contexts related to the same service will be rejected at least based on nature of implementation of the service.

19. The method of claim 12, wherein the request message is a Hypertext Transfer Protocol (HTTP) request message.

20. The method of claim 12, wherein the first network node functions as a Hypertext Transfer Protocol (HTTP) client for transmitting the request message, and comprises at least one of:

a Network Function (NF) service consumer, a Service Communication Proxy (SCP), or an NF service producer.

21. The method of claim 20, wherein the second network node or the third network node functions as a HTTP server for responding to the request message, and comprises at least one of:

an NF service consumer;

an SCP, or an NF service producer.

22. A first network node configured for network node reselection for a context related to a service, wherein the first network node has selected a second network node for providing a service to be consumed by the first network node, and the context related to the service has been created, the first network node comprising:

at least one processor, and at least one memory, storing instructions which, when executed on the at least one processor, cause the first network node to:

determine to reselect a third network node that can provide the service for the context that was provided by the second network node; and transmit a request message for the service to the third network node, the request message comprising property information about the request message;

wherein said property information about the request message comprises at least one of:

information indicating that the request message is involving a reselection due to a failure of reaching the second network node, information indicating that the request message is involving a reselection due to overload control for the second network node, or information indicating that the request message is involving a reselection due to a temporary rejection from the second network node during a last attempt to the second network node.

23. A third network node configured for network node reselection for a context related to a service, wherein a first network node has selected a second network node for providing the service consumed by the first network node, and the context related to the service has been created, the third network node comprising:

at least one processor, and at least one memory, storing instructions which, when executed on the at least one processor, cause the third network node to:

receive, from the first network node, a request message for the context, the request message comprising property information about the request message, wherein said property information about the request message comprises at least one of:

information indicating that the request message is involving a reselection due to a failure of reaching the second network node, information indicating that the request message is involving a reselection due to overload control for the second network node, or information indicating that the request message is involving a reselection due to a temporary rejection from the second network node during a last attempt to the second network node;

determine whether the request message is rejected or accepted at least based on the property information about the request message; and transmit, to the first network node, a response message comprising an indication of whether the request message is rejected or accepted.

* * * * *